Patented Sept. 29, 1936

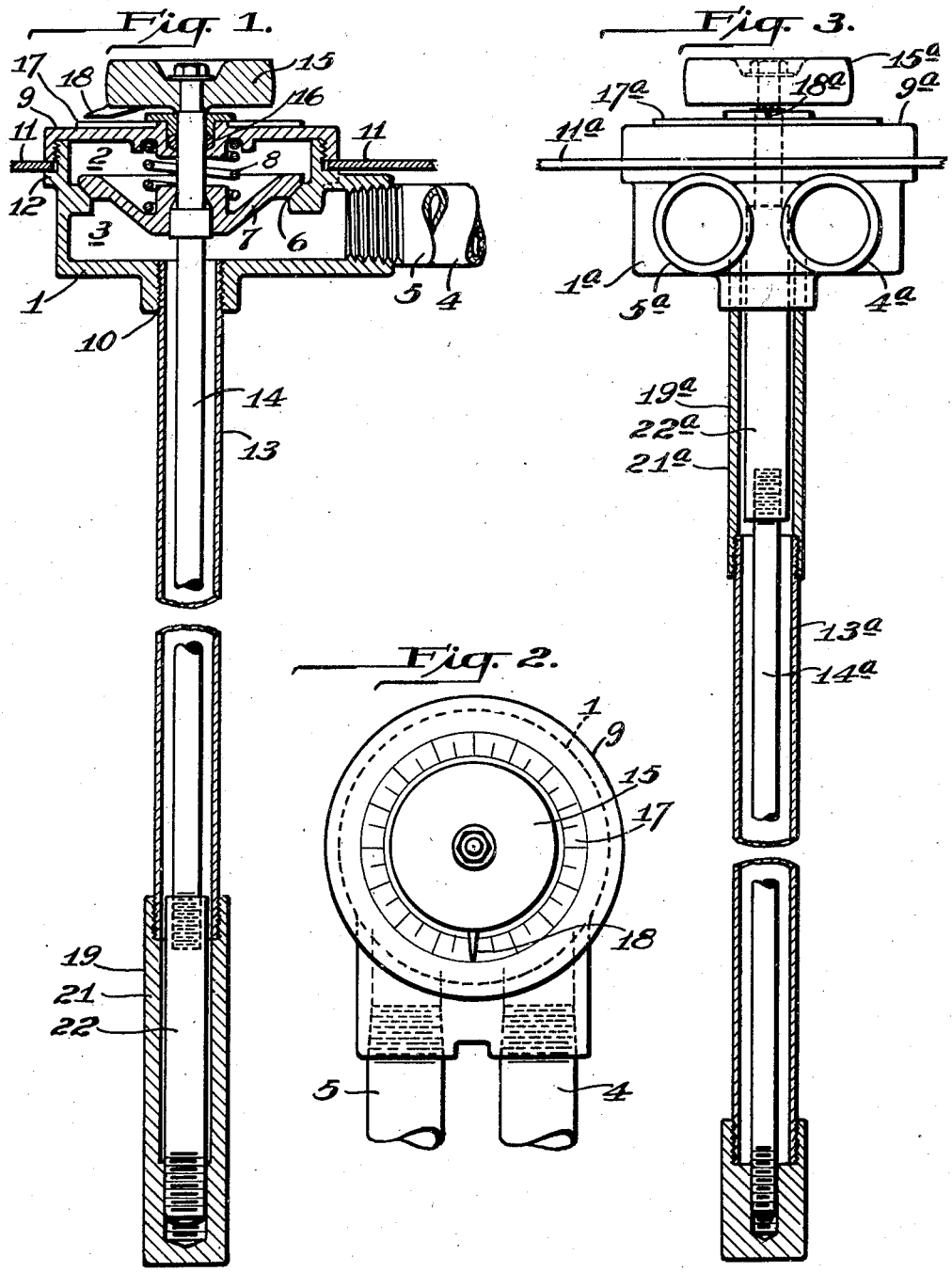

2,055,922

UNITED STATES PATENT OFFICE 2,055,922

THERMOSTAT

William J. Brennen, Scottdale, Pa.

Application August 5, 1933, Serial No. 683,840

7 Claims. (Cl. 236—102)

This invention relates to thermostats, and more particularly to thermostats of the type used for regulating the temperature of gas-fired ovens and the like, although not necessarily so limited.

A difficulty common to thermostats of the character contemplated by the invention as constructed and used in the past is that due to the varying temperature conditions maintaining in the walls of an oven in which they are used and in supporting structure combined with the thermal elements proper, they are incapable of providing a preselected temperature in an oven until a relatively long period of time has elapsed after the oven is set in operation. Such period frequently ranges from thirty minutes to an hour and is often longer than the time required to treat many articles placed in the oven. Hence, either the articles are not treated at the temperature intended, or else considerable heat is wasted while the user is waiting for the thermostat to become stable. As a rule such thermostats usually permit the oven at starting to rise to a temperature considerably over the temperature desired and then causes it to fluctuate for a considerable time until the desired temperature is finally reached.

For obvious reasons it is highly desirable to be able to provide for controlling an oven or the like compartment in such way that it can be started and heated with a minimum of delay to a desired temperature, and such temperature accurately and dependably maintained when reached. With this in mind it is an object of this invention generally stated to provide an improved thermostat for uses of the nature referred to above which is capable of controlling the operation of a gas-fired oven or the like in such a way that the oven may be rapidly and gradually heated to a preselected temperature and such temperature accurately and dependably maintained as soon as it is established.

A more particular object, however, is to provide in a thermostat for compensating for the disturbing influence which the walls of an oven or the like in which the thermostat is used and the supporting structure of the associated parts of the thermostat have upon the thermal elements proper.

These and various other objects, as well as the various other novel features and advantages of the invention, will be apparent when the following detailed description is read in conjunction with the accompanying drawings, of which Fig. 1 is a sectional view of an oven thermostat constructed in accordance with the invention; Fig. 2 an elevational view of the regulator end of such thermostat; and Fig. 3 a view partly in section and partly in plan looking upwardly from the bottom of a modified form of the invention.

Referring in detail to the drawing, and first more particularly to Figs. 1 and 2, the numeral 1 designates a valve casing of a type commonly used in thermostats of this character, being made of relatively heavy material and divided into an inlet chamber 2 and an outlet chamber 3 to which suitable pipes 4 and 5 are connected for conducting a fuel such as a gas to a burner, not shown, which is employed to heat the oven in which the thermostat is located. Seated in an opening 6 connecting the inlet and outlet chambers of this casing there is provided a suitable valve 7 which is normally maintained on its seat by a compression spring 8 arranged between it and a removable cover 9 mounted on the outer end of the casing 1. This cover, as shown, is adapted to also engage the wall 11 of the oven and force it against a rib 12 on the casing to hold the thermostat in place.

For operating the valve 7, a highly expansible tube 13 is threadably mounted in an opening 10 in the casing 1 and extended into the interior of the oven, and within it there is arranged a valve-actuating rod 14 which is preferably made of some suitable material having an extremely low or unappreciable coefficient of expansion. As shown, this rod is extended through the valve 7 and the cover 9, although engaged in the valve so as to open it when moved outwardly, and provided at its outer end with a regulating wheel 15 for turning it to vary the operation of the valve as will presently appear. To prevent any leakage of fuel, a suitable packing 16 is provided about this rod 14 where it passes through the cover 9, and a calibrated dial 17 is mounted opposite the regulating wheel which is provided with a pointer 18 to indicate the temperature setting of the thermostat.

In accordance with the invention the thermal tube 13 is made as thin and light as is permissible from the standpoint of strength so that it will follow as closely as is possible the changes in temperature in the oven, and also so that it will be influenced in its operation a minimum amount by the conduction of heat from it to the valve casing during the period when such casing is being heated up to the temperature which the thermostat may be set to maintain in the oven, which, as is well known, will lag the heating of the thermal element and also that of the oven quite considerably. As will be appreciated, by reason of its thinness such tube will be able to take on heat almost as rapidly as the casing can conduct heat from it, hence minimizing such conduction effect.

To eliminate completely from the operation of the thermostat the effect upon it of the heat-conducting action of the casing 1 and its associated parts as well as the oven wall 11 in which it is mounted, and also that of the heat penetrating the thermostat parts, a compensating coupling or union designated generally by the numeral 19 is employed. This, as shown, connects the outer end of the thermal tube 13 to the valve-actuating rod 14, and consists of a tube 21 which is closed at one end and connected at the other to the tube 13 and an inner rod 22 which is rigidly connected at one end to the valve-actuating rod 14 and adjustably connected at the other in the closed end of the tube 21, this adjustable connection being provided to allow for the regulation of the thermostat through the variation in length of the rods 14 and 22 when the regulator wheel is turned.

To carry out its intended functions this latter coupling 19 is made up of an outer tube 21 formed of material, such as steel, having one coefficient of expansion and an inner tube 22 formed of material, such as brass, having a different coefficient of expansion. These two members are so proportioned that the resultant movement which they impart to the valve actuating rod 14 due to changes in their temperature and their difference in coefficient of expansion is in a direction opposite to that which the movement of the tube 13 tends to actuate the rod 14 under the same condition of heating. In addition, these parts are so proportioned with respect to mass and dimensions that whenever the oven is heated there will be a delay in their reaching the temperature of the oven which is equivalent to the delay occurring in the temperature of the casing 1 reaching that of the oven. That is, they are so constructed as determined by the mass and construction of the casing 1 and the characteristics of the oven wall that they will just compensate for the effect on the thermal tube 13 which the casing 1 and the other parts of the thermostat have upon that tube as a result of the heat which they extract from it while the oven is being brought up to a stable temperature. In other words, they are so designed as to accurately compensate for the delay in expansion of the tube 13 adjacent the valve casing 1, which is caused by the delay in such casing developing a stable temperature as the oven is heated. It will be understood, of course, that this result can be accomplished through the use of other materials in the coupling unit 19 by properly proportioning them and designing them as may be determined by accurate tests. Furthermore, for certain installations where desired the compensating unit may be constructed with a greater time lag than the supporting casing has to provide a thermostat which will arrive rapidly at a temperature somewhat below the temperature desired and then more gradually rise to the selected temperature and do so without exceeding the temperature which it is set to maintain.

Another way of practicing the invention is that shown in the embodiment illustrated in Fig. 3, wherein the coupling element 19a is mounted at the inner ends of the thermal elements 13a and 14a. In such a construction, however, the coupling must compensate for the heat drawn through it by the valve casing, as well as the amount drawn from the thermal element, and as it is larger and heavier than the thermal element and hence a better heat conductor it will require differently-proportioned elements than it does when mounted on the free end of the thermostat, as will be apparent to those skilled in the art.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A thermostat comprising a supporting casing, a control element mounted in said casing, a relatively light and highly expansible thermal element for operating said control element, a motion-transmitting element of negligible expansibility for operating said control element in response to the movement of said thermal element, and a thermal-connecting union having a reverse coefficient of expansion to that of the thermal element connected between said thermal element and the motion-transmitting element and so proportioned as to accurately compensate for the effect upon the thermal element of the heavier casing on which it is supported.

2. A thermostat comprising a supporting casing, a control element mounted in said casing, a relatively light highly expansible thermal tube mounted in an opening in said casing, an operating rod of relatively low expansibility mounted in said tube and connected to said control element, and means connecting said thermal tube to said operating rod comprising a tube made of one material connected to said thermal tube and a rod made of another material connected between said connecting tube and said operating rod, said two connecting elements being adapted to just compensate in the operation of said thermal element for the effect upon it of the heat conducted from it by said casing when the thermostat is set in operation.

3. A thermostat comprising a supporting casing, a control element mounted in said casing, a highly expansible thermal element connected to said casing, an element of relatively low expansibility connected to said thermal element and said control element for imparting to the latter the movement of the former, and means interposed between said thermal element and said motion-transmitting element which is provided with a reverse coefficient of expansion to said thermal element and weight which delays its operation sufficiently to compensate for the effect produced upon the thermostat by the heat conducted from the thermal element to said casing until the latter reaches a stable temperature.

4. A thermostat comprising a supporting casing, a control element mounted in said casing, a thermally expansible element connected in an opening in said casing, a second thermally expansible element of different material connected to said first-mentioned thermal element, a third thermally expansible element made of a different kind of material connected to said second thermal element, and a non-expansible element connected between said third-mentioned element and said control element, said second and third-mentioned thermal elements being provided with a combined coefficient of expansion which just compensates for the effect upon the first thermal element of the heat conducted from said element to said casing during the period when said casing is being heated to a stable temperature.

5. A thermostat comprising a supporting casing, a control element mounted in said casing, a thermally expansible element mounted in an opening in said casing, a second thermally expansible element made of different material connected to said first-mentioned thermal element, a non-expansible element connected to said second-mentioned thermal element, and a third thermally expansible element connected between said non-expansible element and said control element, said first and third-mentioned thermal elements being provided as a unit with a coefficient of expansion which is contrary to that of said second mentioned expansible element and is of a value determined by the construction of said latter part whereby they are adapted to accurately compensate in said thermostat for the effect upon said second-mentioned thermal element of the heat-conducting action of said casing as said casing is being heated to a stable temperature.

6. A thermostat comprising a supporting casing, a control element carried thereby, and a heat-responsive assembly for thermally controlling with precision the operation of said control element, said assembly consisting of a highly expansible element for actuating said control element, an element of low expansibility for transmitting the motion of said highly expansible element to said control element, and a thermal coupling comprising one element connected in series with said control element and said low expansible element and another element connected in series with said highly expansible element and said casing and having a combined coefficient of expansion which is negatively expansible as compared in effect on the control element to said highly expansible element and adapted by the construction of said coupling element to compensate for the effect upon the entire assembly of the heat absorbed by said casing.

7. A thermostat comprising a supporting casing, a control element mounted in said casing, a thermal unit disposed to effect movement of said control element and consisting of a highly expansible member and a member of low expansibility which are connected to produce a resultant movement in said control element and a second thermal unit arranged to modify the movement which said first unit tends to impart to said control element, said latter thermal unit comprising two members of different coefficients of expansion arranged to produce a movement in said control element which is opposed to the direction of movement produced thereon by the first-mentioned unit.

WILLIAM J. BRENNEN.